Patented Aug. 18, 1942

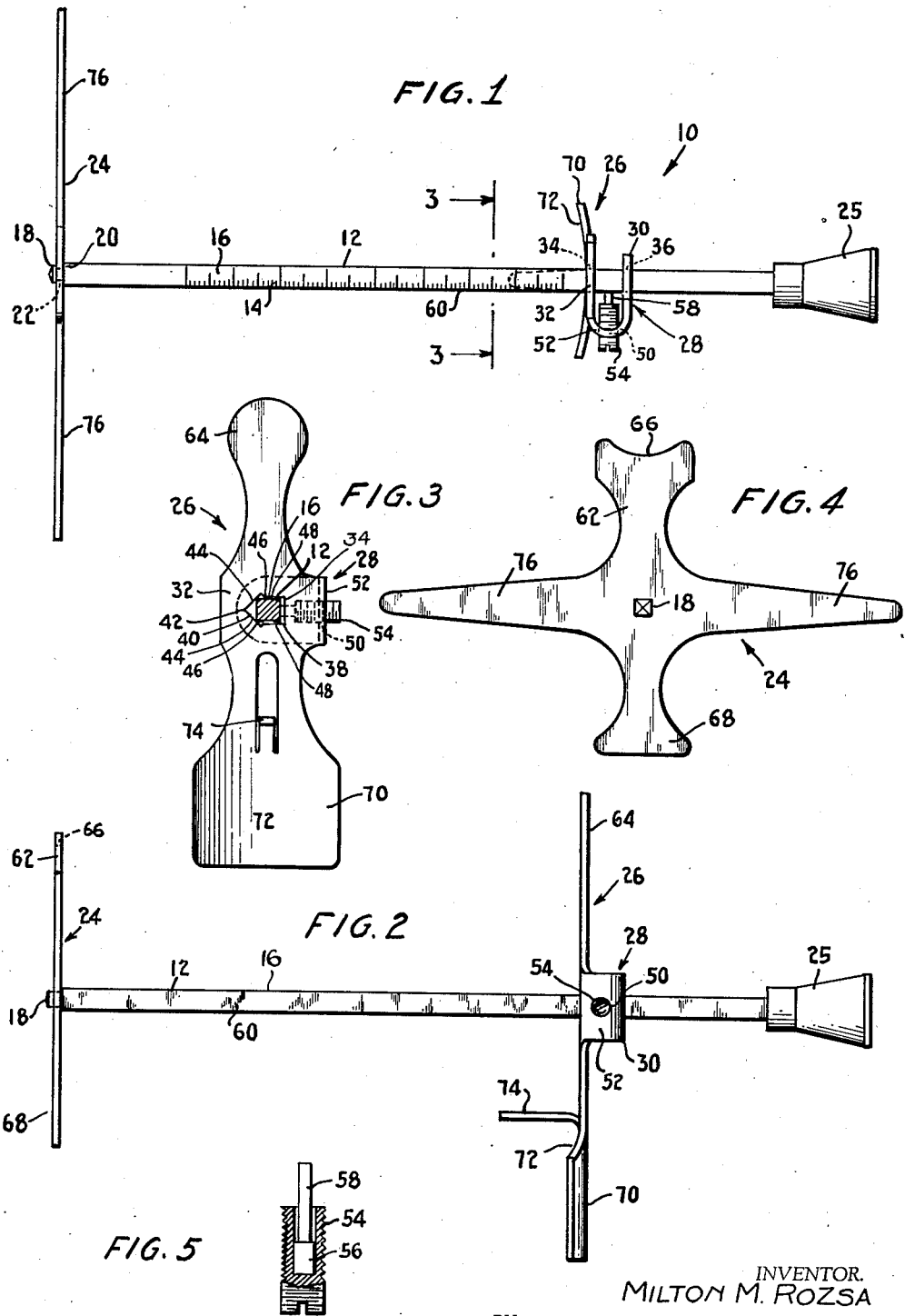

2,293,446

UNITED STATES PATENT OFFICE 2,293,446

FACIAL SURVEYOR

Milton M. Rozsa, New York, N. Y.; Esther Rozsa, administratrix of said Milton M. Rozsa, deceased, assignor to B-D Distributors, Inc., New York, N. Y., a corporation of New York Application May 21, 1941, Serial No. 394,552

10 Claims. (Cl. 33—174)

This invention relates to a facial surveyor.

It has been determined that certain of the dimensions of the human face bear a definite relationship to each other. For instance, it has been observed that the distance from the point where the bridge of the nose meets the forehead to the meeting line of the lips is the same as the distance from the bottom of the chin to the bottom of the nose. The distance from the top of the bridge of the nose to the meeting line of the lips is relatively a fixed distance as it is a dimension of a part of the skull which has no movement of the parts between the termini of that dimension. This is determined and used by the dentist for various purposes.

For instance, after teeth have been removed, the movement of the lower jaw will not be limited properly by engagement of the teeth to determine the proper position of the lower gum when the dentist proceeds to take the necessary impression for an artificial denture. For such purpose, the fixed dimension between the top of the bridge of the nose to the lips may be determined and used to limit the amount of closing of the lower jaw towards the upper jaw when making such a denture.

For this purpose, an instrument designated as a facial surveyor is first adjusted so that the distance between a pair of stops on the surveyor is determined by this dimension from the bridge to the line of intersection of the lips. Then the surveyor is positioned so that one of the stops is in contact with the bottom of the nose. The lower jaw may then be moved until the bottom of the chin engages the other stop, and thus the proper position for making the necessary impression, as if the actual teeth were in place to determine the spacing of the gums, will be assured.

It is an object of the invention to provide an improved facial surveyor capable of adjustment by easy manipulation to transfer such a dimension from one part of the face to the other readily and without any re-adjustment.

It is an object of the invention to provide apparatus of the type herein described which is constructed of a small number of parts, capable of being assembled cheaply, and also so as to lend facility to its use.

Other objects of the invention will be set forth hereinafter, or will be apparent from the description and the drawing in which is illustrated an embodiment of apparatus exemplifying the invention.

The invention, however, is not intended to be restricted to any particular construction, or any particular arrangement of parts, or any particular application of such construction or arrangement of parts, or any specific method of operation, or any of various details thereof, herein shown and described, as the same may be modified in various particulars, or be applied in many varied relations, without departing from the spirit and scope of the claimed invention, of which the exemplifying embodiment, herein shown and described, is intended only to be illustrative, but not to show all the various forms and embodiments in which the invention might be embodied.

On the drawing, in which the same reference characters refer to the same parts throughout, and in which the exemplifying embodiment appears:

Fig. 1 is an elevational view of a facial surveyor embodying features of the invention;

Fig. 2 is a view similar to Fig. 1, wherein the parts have been rotated into a position ninety degrees removed from the position of the parts of Fig. 1;

Fig. 3 is a transverse cross-sectional view on the line 3—3 of Fig. 1;

Fig. 4 is an end elevational view of the structure of Fig. 2 as seen from the left-hand end of Fig. 2; and Fig. 5 is a detail cross-sectional view of the brake screw and associated elements, parts being shown in elevation.

The facial surveyor 10, shown on the drawing, is seen to comprise a metallic bar 12 which is substantially rectangular in cross-section. A scale 14 may be graduated on a face 16 of the bar. One end of the bar may terminate in a pin 18 of slightly smaller cross-section than the bar, to form a shoulder 20. Pin 18 is inserted through an opening 22 in a cut out plate 24, and is riveted over upon the plate to anchor plate 24 in position on the very end of bar 12. Opening 22 and pin 18 may be of non-circular cross-section to assure that plate 24, after pin 18 has been riveted over, will be retained against rotation with relation to bar 12. A handle knob 25 may be affixed at the other end of the bar.

Slidable on bar 12 is an adjustable stop or spoon 26. Spoon 26 is mounted upon bar 12 for adjustment towards and away from fixed plate 24 in the manner to be described. Spoon 26 may be formed in any suitable manner, as, for instance, by stamping from suitable sheet metal, to provide a guiding section 28. Guiding section 28 may take the form of a U by bending a prong 30 from the main body 32 of spoon 26 at guiding section 28 to a position beneath the main body. Openings 34 and 36, formed in body 32 at guiding section 28 and in prong 30, respectively, are substantially in alignment. Each opening may be comprised of two portions, as if a square 38 had been intersected by another and larger square 40, the diagonals of square 40 being turned forty-five degrees from the diagonals of square 38.

Thus, a V-shaped formation 42 is provided, the edges 44 of which provide almost point contact where they engage edges 46 of bar 12. Edges 48, by engaging against bar 12, retain bar 12 and spoon 26 against relative rotation. These edges 48 are so formed as to be positioned out of contact with face 16 and the scale thereon graduated, so that sliding spoon 26 along the bar will not tend to result in scraping the metal from the bar at the graduations of scale 14.

A threaded opening 50 may be formed in cross-bar 52 of the U to receive a set-screw 54. Screw 54 may be hollow to form a seat for a resilient pad 56 and a strip of fibre or similar material 58. Screw 54 positions fibre strip 58 in contact with face 60 bar 12 to provide suitable braking action against unrestricted movement of spoon 26 along bar 12. However, because of the point contact between edges 44 and 46, no marked resistance is set up on manipulation of the spoon to any desired position. In this manner, spoon 26 is permitted movement towards and away from plate 24 to present its elements in association with the elements of plate 24, as further to be described.

Plate 24 may consist of four arms. One arm 62 may extend substantially in the same general direction as a tongue 64 of spoon 26. Arm 62, at its outer end, may be formed to provide a recess 66, following substantially the contour of the nose at the bridge, so that plate 24 may comfortably be engaged upon the bridge of the nose in the use of the surveyor. Tongue 64 extends beyond arm 62, as tongue 64 is intended to extend and be received between the lips as spoon 26 is adjusted along bar 12 to locate arm 62 at the point where the bridge of the nose meets the forehead. The dimension may be determined in the manner just described. However, if the dimension be known, the adjustment may be made by the dentist without the application of the surveyor to the patient, but merely by setting the spoon according to a previous reading of the position of body 32 along scale 14.

After spoon 26 has thus been positioned properly along scale 14, the dentist may use the dimension, so determined, for his purpose. For instance, he may use that dimension by transfer to determine the distance from the bottom of the nose to the bottom of the chain. For this purpose, all he does is to rotate the surveyor upon bar 12 as an axis. Arm 68, which is opposite arm 62, is now in position in relation to the face, and may be engaged directly beneath the nose. The other portion of spoon 26, which takes the form of a chin support 70, is likewise brought into proximity to the bottom of the chin. Chin support 70 may be formed with a concavity 72 to conform to the shaping of the chin. A stop 74 may be provided on support 70, as, for instance, by striking a prong out of body 32. Stop 74 provides means to limit movement of the chin inwardly along support 70, and thus of the surveyor relatively to the chin.

In making the determination of the distance from the bridge of the nose to the intersection of the lips, it is desirable to locate bar 12 in a proper vertical position. A pair of arms 76 are formed with plate 24 and are in substantially the same plane as arms 62 and 68. As the dentist is manipulating the surveyor to determine the dimension, he positions arms 76, by sighting across them, so that they are in line with the line between the two eyes of the patient. The dentist may line arms 76 up with relation to the pupils of the eyes, and thus determine that bar 12 hang absolutely vertically as tongue 64 is adjusted into position between the lips.

In this manner, a device is provided by which, with very simple manipulations which are easily understood, certain fixed dimensions for a properly proportioned face may be ascertained for use for such purposes as in determinations for construction of artificial dentures.

Many other changes could be effected in the particular apparatus designed, and in the methods of operation and use set forth, and in specific details thereof, without substantially departing from the invention intended to be defined in the claims, the specific description being merely of an exemplifying embodiment in accordance with the statutes.

What is claimed as new and useful is:

1. A facial surveyor for making measurements for dentures and the like, the surveyor comprising a bar having a scale defined thereon, a plate secured at one end of the bar, the plate having four extensions, one of the extensions having means for seating against the bridge of the nose, a member adjustably slidable on the bar and having a pair of projections, one of the projections being directed in substantially the same general direction as the bridge-engaging extension and being formed to fit between the lips, two of the other extensions being oppositely directed and providing means for determining a true vertical position for the surveyor by positioning those other extensions in relation to the transverse line of the eyes, the fourth extension and the other projection providing means for seating respectively directly beneath the nose and immediately beneath the chin, the slidable member being assembled with the bar so as to be out of engagement with the portion of the bar having the scale defined thereon, and means for frictionally restraining the slidable member against movement along the bar.

2. A facial surveyor for making measurements for dentures and the like, the surveyor comprising a bar having a scale defined thereon, a plate secured at one end of the bar, the plate having four extensions, one of the extensions having means for seating against the bridge of the nose, a member adjustably slidable on the bar and having a pair of projections, one of the projections being directed in substantially the same general direction as the bridge-engaging extension and being formed to fit between the lips, two of the other extensions being oppositely directed and providing means for determining a true vertical position for the surveyor by positioning those other extensions in relation to the transverse line of the eyes, the fourth extension and the other projection providing means for seating respectively directly beneath the nose and immediately beneath the chin, the slidable member being assembled with the bar so as to be out of engagement with the portion of the bar having the scale defined thereon, and means for frictionally restraining the slidable member against movement along the bar, the extensions and projections providing means for comparing the distance from the bridge of the nose to the bottom of the upper lip with the distance from the bottom of the nose to the bottom of the chin without changing the positions of the parts of the surveyor with relation to each other.

3. A facial surveyor for making measurements for dentures and the like, the surveyor comprising a bar having a scale defined thereon, a plate including four extensions from a single middle section and substantially at right angles to each other, the bar extending substantially perpendicularly away from the middle section, one of the extensions having means for seating against the bridge of the nose, a member adjustably slidable on the bar and having a pair of projections, one of the projections being directed in substantially the same general direction as the bridge-engaging extension and being formed to fit between the lips, two of the other extensions being oppositely directed and providing means for determining a true vertical position for the surveyor by positioning those other extensions in relation to the transverse line of the eyes, the fourth extension and the other projection providing means for seating respectively directly beneath the nose and immediately beneath the chin, the slidable member being assembled with the bar so as to be out of engagement with the portion of the bar having the scale defined thereon, and means for frictionally restraining the slidable member against movement along the bar.

4. A facial surveyor for making measurements for dentures and the like, the surveyor comprising a bar of substantially polygonal cross-section, the bar having a scale defined on one of its side faces, a plate secured at one end of the bar, the plate having four extensions, one of the extensions having means for seating against the bridge of the nose, a member adjustably slidable on the bar and having a pair of projections, one of the projections being directed in substantially the same general direction as the bridge-engaging extension and being formed to fit between the lips, two of the other extensions being oppositely directed and providing means for determining a true vertical position for the surveyor by positioning those other extensions in relation to the transverse line of the eyes, the fourth extension and the other projection providing means for seating respectively directly beneath the nose and immediately beneath the chin, the slidable member being assembled with the bar to engage against portions other than the side face having the scale defined thereon, and means for frictionally restraining the slidable member against movement along the bar.

5. A facial surveyor for making measurements for dentures and the like, the surveyor comprising a bar, a plate secured at one end of the bar, the plate having four extensions, one of the extensions having means for seating against the bridge of the nose, a member adjustably slidable on the bar and having a pair of projections, one of the projections being directed in substantially the same general direction as the bridge-engaging extension and being formed to fit between the lips, two of the other extensions being oppositely directed and providing means for determining a true vertical position for the surveyor by positioning those other extensions in relation to the transverse line of the eyes, the fourth extension and the other projection providing means for seating respectively directly beneath the nose and immediately beneath the chin, and means for frictionally restraining the slidable member against movement along the bar.

6. A facial surveyor for determining facial proportions and the like, the surveyor comprising a bar having a scale defined thereon, a plate secured at one end of the bar, the plate having the form of a cross, one of the arms of the cross having means for seating against the bridge of the nose, a member adjustably slidable on the bar and having a pair of projections, one of the projections being directed in substantially the same general direction as the bridge-engaging arm and being formed to fit between the lips, two of the other arms of the cross being oppositely directed and providing means for determining a true vertical position for the surveyor by positioning those other arms in relation to the transverse line of the eyes, the fourth arm and the other projection providing means for seating respectively directly beneath the nose and immediately beneath the chin, the slidable member being assembled with the bar so as to be out of engagement with the portion of the bar having the scale defined thereon, and means for frictionally restraining the slidable member against movement along the bar.

7. A facial surveyor for determining facial proportions and the like, the surveyor comprising a bar having a scale defined thereon, a plate including four arms extending from a single middle section and substantially at right angles to each other, the bar extending substantially perpendicularly away from the plane of the middle section, one of the arms having means for seating against the bridge of the nose, a member adjustably slidable on the bar and having a pair of projections, one of the projections being directed in substantially the same general direction as the bridge-engaging arm and being formed to fit between the lips, two of the other arms being oppositely directed and providing means for determining a true vertical position for the surveyor by positioning those other arms in relation to the transverse line of the eyes, the fourth arm and the other projection providing means for seating respectively directly beneath the nose and immediately beneath the chin, the slidable member being assembled with the bar so as to be out of engagement with the portion of the bar having the scale defined thereon, and means for frictionally restraining the slidable member against movement along the bar.

8. A facial surveyor for determining facial proportions and the like, the surveyor comprising a bar, a plate disposed transversely of one end of the bar, the plate comprising a plurality of arms, one of the arms having means for seating against the bridge of the nose, a member adjustably slidable on the bar and having a pair of projections, one of the projections being directed in substantially the same general direction as the bridge-engaging arm and being formed to fit between the lips, two of the other arms being oppositely directed to provide means for determining a true vertical position for the surveyor by positioning those other arms in relation to the transverse line of the eyes, the fourth arm and the other projection providing means for seating respectively directly beneath the nose and immediately beneath the chin, and means for frictionally restraining the slidable member against movement along the bar.

9. A facial surveyor for determining facial proportions and the like, the surveyor comprising a bar, a plate disposed transversely of one end of the bar, the plate comprising a plurality of arms, a member adjustably slidable on the bar and having a pair of oppositely directed projections, the projections being directed in substantially the same general direction as certain of the arms, one of the arms and one of the projections being paired and the member being adjustable for ascertaining a dimension from the bridge of the nose to the lower portion of the top lip, another arm and the other projection being thereby automatically spaced and being constructed to be assembled in relation to the bottom of the chin and the bottom of the nose to check that dimension, two other arms being oppositely directed to provide means for determining the true vertical relation of the bar by comparison with the transverse line of the eyes, and means for frictionally retaining the slidable member in a position to which it had been adjusted on the bar.

10. A facial surveyor for determining facial proportions and the like, the surveyor comprising a bar, a plate disposed transversely of one end of the bar, the plate comprising a plurality of arms, a member adjustably slidable on the bar and having a pair of oppositely directed projections, the projections being directed in substantially the same general direction as certain of the arms, one of the arms and one of the projections being paired and the member being adjustable for ascertaining a dimension from the bridge of the nose to the lower portion of the top lip, another arm and the other projection being thereby automatically spaced and being constructed to be assembled in relation to the bottom of the chin and the bottom of the nose to check that dimension, two other arms being oppositely directed to provide means for determining the true vertical relation of the bar by comparison with the transverse line of the eyes, the slidable member having a U-shaped section, the arms of the U having openings therein, the bar passing through the openings, and means engaged in the arm of the U for frictionally retaining the slidable member in a position to which it had been adjusted on the bar.

MILTON M. ROZSA.